Jan. 21, 1930.
A. I. MARCUM
1,744,401
TANDEM AXLE VEHICLE
Filed Sept. 27, 1928
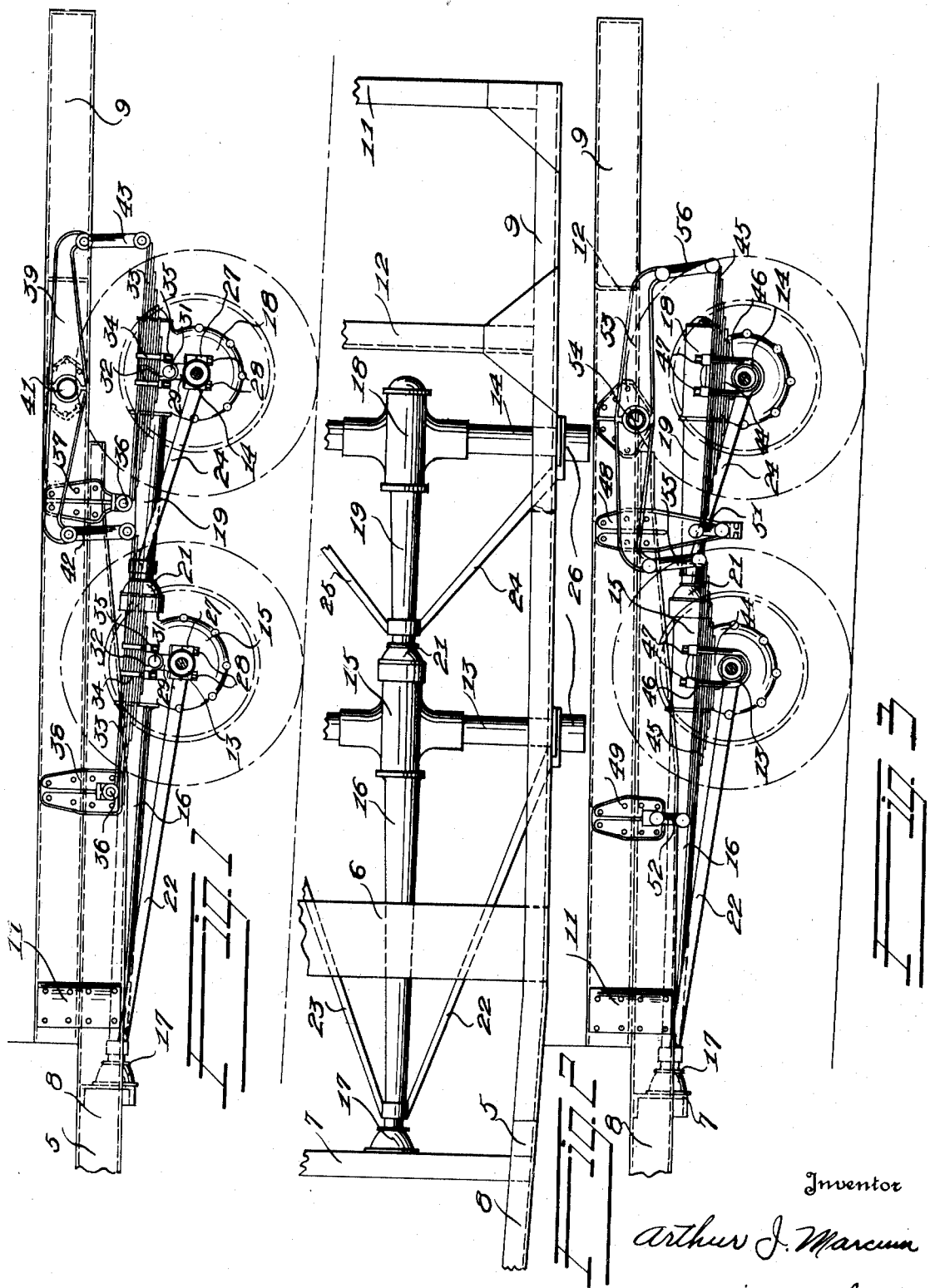
Inventor
Arthur I. Marcum
By William A. Strauch
Attorney Patented Jan. 21, 1930

1,744,401

UNITED STATES PATENT OFFICE

ARTHUR I. MARCUM, OF OAKLAND, CALIFORNIA

TANDEM-AXLE VEHICLE

Application filed September 27, 1928. Serial No. 308,646.

The present application is a continuation in part of my copending application, Serial No. 32,357, filed May 23, 1925, and relating to flexible spring suspensions for multi-wheel vehicles.

This invention relates to a road vehicle of the type that include tandem axles disposed adjacent one end of the vehicles. More particularly the invention relates to vehicle constructions applicable to tandem axle vehicles generally, and particularly adapted for the construction of dual axle vehicles from an ordinary vehicle, including but a single driven axle disposed adjacent the rear of the chassis, by the addition to the frame of such vehicle of an extension therefor, and by the further addition thereto of a second axle suitably interconnected to the frame and to the other axle.

A primary object of the invention is to provide an extremely simple and practical multi-wheel road vehicle construction, that may be readily applied to the building up of multi-wheel vehicles from ordinary two axle vehicles by the addition thereto of an extension for the frame and an additional axle, utilizing duplicate parts of the vehicle to a large extent.

A further object of the invention is to provide a multi-wheel road vehicle embodying a through drive shaft housed in torque tubes that are flexibly supported at one end and serve to hold the axles in properly spaced position, in combination with novel compensating means or suspensions for connecting the axles to the vehicle frame.

A still further object of the invention is to provide a through drive for a multi-drive axle vehicle, novel coacting spring suspensions, and torque tubes to separately resist the torque reactions imposed on the housing of each axle, the drive shaft sections being housed within the torque tubes and provided with flexible joints at the points at which the torque tube is flexible, whereby an extremely compact and practical arrangement is provided.

A still further object for the invention is to provide a spring suspension for tandem axle vehicles that will yieldingly resist the movement of the several drive axles toward and from the frame, permitted by their connection to the frame while allowing a relatively large range of movement of each axle, and in which springs are provided that are individual to each axle and including means to equalize or distribute the load on the several axles and to transmit a substantial portion of the shocks to which one axle may be subjected to the springs of the other drive axle.

Further objects of the invention will appear as the description thereof proceeds with reference to the accompanying drawings in which—

Figure 1 is a side elevation of the rear portion of a vehicle, the body being omitted and the wheels diagrammatically indicated in outline.

Figure 2 is a partial top plan view of the construction illustrated in Fig. 1, the wheels and springs being omitted.

Figure 3 is a side elevation of a modified form of spring suspension.

Similar reference characters indicate like parts throughout the several views.

The improved vehicle of this invention is preferably constructed from an ordinary vehicle having only a single drive axle by the addition thereto of an extension to the frame and by the further addition of a second drive axle preferably of a construction similar to the first axle, although it will be obvious to those skilled in the art that such a vehicle may be constructed without using a four wheel vehicle as a base construction. In the drawings the numeral 5 indicates a portion of the frame of an ordinary vehicle having a single drive axle. Said frame includes transverse members 6 and 7 rigidly secured to longitudinal members 8. The frame just described is extended rearwardly by attaching to each longitudinal member 8 a member 9 that is rigidly secured thereto in any suitable manner, as by lapping a portion of each of members 8 and 9 and securing the lapped portions together by plates 11 and spring attaching brackets hereinafter described. Members 9 are rigidly connected together by transverse members 11 and 12.

The parts so far referred to, being all rigidly united together, form an elongated frame for the improved vehicle.

Arranged adjacent the rear end of the frame just described are drive axles 13 and 14. The axle 13 is provided with a housing 15 for the usual differential and for a gear such as a worm to drive said differential. The axle 13 is held in proper position endwise of the frame by a torque tube 16 that is rigidly bolted at one end to the housing 15 and that is connected at its other end by means of a universal joint 17 to the transverse member 7 of the frame 5. The drive shaft for the gear such as a worm included in the housing 15 extends through the tube 16 and is provided with a universal joint, the center of which is approximately coincident with the center of the universal joint 17.

The axle 14 is provided with a housing 18 containing the usual differential and a gear for actuating the same, such as a worm. Said axle is held in proper position endwise of the frame by a torque tube 19 that is rigidly bolted at one end to the housing 18 and that is connected at its other end to the housing 15 by means of a universal joint 21. The drive shaft for the axle 13 extends through the housing 15 and continuously through the torque tube 19 to operate the worm that drives the rear axle 14. Said drive shaft is also provided with a universal joint disposed within the universal joint 21 so that the center thereof is approximately coincident with the center of the universal joint 21.

In order to firmly hold the ends of the axles in proper position endwise of the frame the axle 13 is provided with radius rods 22 and 23 each secured at one end to the axle 13 adjacent an end of the axle. The other end of each of said radius rods is rigidly united in any suitable manner to the torque tube 16 adjacent the universal joint 17 thereof. The ends of the axle 14 are likewise supported against movement endwise of the frame by radius rods 24 and 25 each rigidly secured at one end to the torque tube 19 adjacent the universal joint 21 and at its other end to the axle 14 adjacent an end thereof.

By the arrangement so far described the axle 13 is held from movement endwise of the frame by the torque tube 16 and the radius rods 22 and 23. However, said axle is free to swing in a substantially vertical plane and to tilt with respect to a line passing centrally longitudinally of the frame, this action being permitted by the universal joint 17. Similarly the axle 14 is held from movement toward the axle 13 and endwise of the frame, since the axle 13 itself is incapable of moving in this direction by the torque tube 19 and the radius rods 24 and 25. The universal joint 21 however, permits the axle 14 to swing freely in vertical planes and to tilt with respect to a line passing centrally longitudinally of the frame.

In order to yieldingly resist the movements of the axles 13 and 14 just described and in order that the shocks applied to one axle may be transmitted in part to the other axle the axles are yieldingly connected to the frame in a manner about to be described. This arrangement is illustrated in Figure 1 of the drawings showing the arrangement on one side of the frame. It will be clear to any person skilled in the art that this arrangement is duplicated at the other side of the frame. Journalled on the outer end of each of the axles 13 and 14 immediately outward of the connections of radius rods 22, 23, 24, and 25 therewith and inwardly of the wheels carried thereby as indicated at 26 in Fig. 2, is a two part bearing block or saddle 27, the parts of which are secured together and in journaled relation to the axle by means of bolts 28. Each of the blocks 27 is provided with an outwardly projecting arm 29 which is pivotally connected at 31 to a spring supporting pad 32 to which a leaf spring assembly 33 is secured by U-bolts 34, and nuts 35 substantially midway between the ends thereof. Corresponding ends of leaf springs 33 at each side of the vehicle are pivotally connected at 36 to brackets 37 and 38 which are bolted to members 8 and 9 of the frame, and which besides forming pivot bearings for the springs assist plates 11 in holding lapped members 8 and 9 in rigid position. If it is desired to convert a Ford truck into a multi-wheel vehicle the spring assemblies 33 may be of the Ford type. Similarly if another type of car is converted into a multi-wheel vehicle, the springs are preferably of the kind that are standard in that type.

In order to equalize the load on the axles and in order that shocks to the springs of one axle may be transmitted in part to the springs of the adjacent axle the springs assemblies 33 at each side of the vehicle are connected together by a lever 39 that is pivoted at 41 to the frame of the vehicle. The ends of said lever are shackled to the ends of the spring assemblies opposite the pivoted ends 36 by shackles 42 and 43.

In operation, power is transmitted to the drive axles 13 and 14 by means of the continuous drive shaft contained in the torque tubes 16 and 19. The torque reactions imposed on the housings 15 and 18 of said drive axles are resisted by said torque tubes, which also serve the purpose of holding the axles in definite spaced relation endwise of the frame. In view of the universal joints 17 and 21 however, each axle is free to rise and fall or to tilt in vertical planes as the wheels carried thereby pass over irregularities in the road. When irregularities are encountered by the wheels the upward movement of each axle is resisted by the springs 33, journaled blocks 27 and pivotal connections of arms 29 with spring pads 32 permitting the springs to pivot about their end connections 36 with the frame with the opposite ends of the springs moving in a path permitted by shackles 42 and 43 by which said ends are flexibly connected to the opposite ends of the lever 39 when the springs are deflected in order that destructive road shocks are not transmitted to the torque resisting connection and the drive shaft housed thereby. It will be observed further that when the axle 13 moves in a vertical plane carrying with it the mid portions of the associated spring assemblies 33 the shackles 42 will be carried upwardly a distance substantially equal to one half the movement of the axle, because the connections of the shackles 42 to the spring assemblies 33 is at a point substantially equidistant from axle 13 with the pivotal connections 36 therefrom. Upward movement of the shackles 42 causes the lever 39 to swing on its pivot 41 transmitting the shock in a downward direction to the companion spring assembly 33 on the same side of the vehicle in a manner that will be readily understood. It will thus be seen that each drive axle is free to move substantially in a vertical plane without causing a corresponding movement of the frame of the vehicle, and that the shocks to a spring that is individual to one axle are transmitted in a reverse direction to the spring that is individual to the other axle and positioned at the same side of the vehicle. Further, in view of the fact, that the flexible joints 21 and 17 in the torque tubes 19 and 16 are coincident with the universal joints in the drive shaft that is housed in these torque tubes, the freedom of the drive axles just referred to is permitted without setting up destructive stresses in the drive shaft or in the torque connections.

A modified form of spring suspension that permits use of a lower vehicle frame with the same ground clearance may be used in lieu of that just described is illustrated in Figure 3 of the drawings. As shown in this figure each of the axles 13 and 14 is provided with a saddle 44 journaled thereon at each side of the vehicle to which the intermediate portion of a spring assembly 45 is rigidly secured by means of U-bolts 46 and nuts 47 substantially off center thereof. Corresponding ends of spring assemblies 45 at each side of the vehicle are flexibly connected to brackets 48 and 49 rigidly secured to members 8 and 9 of the frame by means of shackles 51 and 52. The other ends of spring assemblies 45 are shackled to the opposite ends of an equalizing lever 53 pivoted at 54 to the frame member 9 by shackles 55 and 56. This arrangement secures substantially the same results secured by the form of spring suspension shown in Figure 1, though the frame movement due to movements of the axle is somewhat less in this form of the invention since the springs individual to the axles are secured thereto nearer the lever connected ends thereof than in the first described form.

By shackling the ends of the spring assemblies to the vehicle frame as in Fig. 3 the equalizing lever may be disposed in a lower position, thus permitting a lowering of the floor line with the same ground clearance.

In operation of the form of the invention shown in Figure 3, shocks to one axle are transmitted to the spring suspensions individual to that axle and partially absorbed thereby. Movement of each axle beyond the absorbing capacity of the springs 45 about the shackle connections 51 and 52 can occur. Such movement causes the opposite ends of springs 45 to move in the direction of the axle movement. This movement is yieldingly resisted by equalizing lever 53 because the swinging of said lever is yieldingly resisted by its connection to the other springs supported by the other axle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. In a multi-wheel vehicle construction, a chassis frame; a pair of tandem axles disposed beneath one end of said frame; an inextensible member universally connected to said frame and secured to one of said axles to cause the axis thereof to be definitely spaced from the universal connection; a similar member universally connected to said one axle and secured to the other axle; both axles thereby being enabled to swing and to tilt with respect to each other and with respect to a predetermined point; and a longitudinally arranged spring mechanism at each side of the frame for resiliently connecting the axles to the frame, said mechanism including springs directly pivoted to portions of the frame, and means flexibly interconnecting said springs and axles, whereby said axles may take the above-mentioned swinging and tilting movements without restriction.

2. In a multi-wheel vehicle construction, a frame; a pair of tandem axles disposed beneath one end of said frame; a member flexibly interconnecting the frame and one of said axles to cause all points of the latter to swing vertically in defined paths during operation; means flexibly interconnecting said axles to space them from each other; and a longitudinally arranged spring mechanism at each side of the frame, said mechanisms including springs directly connected to portions of the frame and of materially different effective lengths than said interconnecting member, and means flexibly interconnecting said springs and said axles, whereby said axles may swing vertically without restriction in spite of said different lengths.

3. In the construction defined in claim 2, said member being rigidly secured at one end to said one axle; and said last mentioned means comprising shackles carried by said axles and pivotally connected to said springs to maintain the latter in offset relation to said axles.

4. In the construction defined in claim 2, said spring mechanisms each comprising a pair of leaf springs, each connected at one end to the frame on horizontal pivots and connected to one of said axles substantially at its mid-point, and means connecting the opposite ends of said pair of springs together and to the frame.

In testimony whereof I affix my signature.

ARTHUR I. MARCUM.